United States Patent [19]

Casey et al.

[11] Patent Number: 5,787,089
[45] Date of Patent: Jul. 28, 1998

[54] DIGITAL SIGNAL BROADCASTING

[75] Inventors: Liam M. Casey; David I. Allan, both of Ottawa, Canada

[73] Assignee: Northern Telecom Limited, Montreal, Canada

[21] Appl. No.: 687,302

[22] Filed: Jul. 25, 1996

[51] Int. Cl.⁶ .................... H04N 7/173; H04L 12/56
[52] U.S. Cl. .................... 370/397; 370/399; 348/423
[58] Field of Search .................... 370/397, 432, 370/473, 486, 423, 399, 395, 389; 348/423, 388; 380/20, 21, 29, 15

[56] References Cited

U.S. PATENT DOCUMENTS

| | | | |
|---|---|---|---|
| 4,613,901 | 9/1986 | Gilhousen et al. | 380/20 |
| 4,634,808 | 1/1987 | Moerder | 380/29 |
| 5,420,866 | 5/1995 | Wasilewski | 370/426 |
| 5,473,696 | 12/1995 | Van Breemen et al. | 380/49 |
| 5,513,178 | 4/1996 | Tanaka | 370/395 |
| 5,592,554 | 1/1997 | Moehrmann | 380/48 |
| 5,627,836 | 5/1997 | Conoscenti et al. | 370/397 |

*Primary Examiner*—Chau Nguyen
*Assistant Examiner*—Kenneth Vanderpuye
*Attorney, Agent, or Firm*—R. John Haley

[57] ABSTRACT

A distribution network groups television program signals into service tiers. To provide these from unsynchronized MPEG streams without resynchronization, each stream, representing a single program signal is encapsulated into ATM cells with a virtual path (VP) identification of each ATM cell corresponding to the service tier and a virtual channel (VC) identification corresponding to the respective program signal. Payloads in cells having the same VP are scrambled using a scrambling key allocated to that VP and hence to the corresponding service tier, and are unscrambled by entitled subscribers using the scrambling key which is supplied to them individually using public/private encryption techniques.

14 Claims, 2 Drawing Sheets

DIGITAL SIGNAL BROADCASTING

This invention relates to digital signal broadcasting, especially of television signals.

BACKGROUND OF THE INVENTION

It is well known to provide broadcast distribution of television signals for example via a cable television network, from a head end of the network to subscribers. The cable network operator constitutes a service provider, to whom the television signals are typically supplied by content providers, each of whom may provide one or more television program signals. Typically, the service provider groups selected television program signals from different content providers into different service packages, or tiers, to which the subscribers can subscribe, each subscriber to a service tier being enabled to use all of the program signals within that service tier.

Increasingly, digital signals are being used or proposed for use for communicating television program signals from content providers to service providers, and from service providers to subscribers. To facilitate this, the television program signals are conveniently compressed into a digital bit stream in accordance with standards such as the MPEG (Moving Pictures Experts Group) standard MPEG-2. The resulting bit stream is referred to as an MPEG stream. The MPEG stream can also include arbitrary types of signal other than, and in addition to, television program signals, but for convenience and simplicity only television program signals are discussed here, it being understood that the same comments apply equally to other signals.

An MPEG stream containing a television program signal comprises encoded, compressed, program data with a time sequence providing timing (clocking) information to enable a decoder to reconstruct the program data to reproduce the television program signal. Where a content provider supplies a plurality of television program signals, it is desirable to do this in a single MPEG stream using a time sequence that is common to all of the signals, thereby reducing the amount of information that must be communicated.

Similarly, for digital broadcast of a service tier from a service provider to subscribers, it is desirable for the service provider to provide a single MPEG stream which contains all of the program data for the television program signals in the service tier, together with a time sequence that is common to all of these signals, and entitlement information that enables only entitled subscribers to recover the television program signals. However, because the television program signals in the service tier are generally supplied by different content providers that are unsynchronized relative to one another, this grouping into a single MPEG stream for each service tier necessitates a resynchronization of the television program signals at the service provider. This process is computationally very intensive and undesirable.

An object of this invention is to provide a method of digital signal broadcasting that enables this disadvantage to be avoided or reduced.

SUMMARY OF THE INVENTION

According to one aspect, this invention provides a method of broadcasting a plurality of digital signals, each comprising a data stream including data and timing information, to a distribution network for supply to a plurality of subscribers, comprising the steps of: allocating a virtual path (VP) identification of ATM (asynchronous transfer mode) cells to the plurality of digital signals and a respective virtual channel (VC) identification of the ATM cells to each individual one of the plurality of digital signals; encapsulating the data stream of each of the plurality of digital signals in ATM cells having said VP identification and the respective VC identification; scrambling the encapsulated data stream in each ATM cell having said VP identification in dependence upon a scrambling key allocated to the VP; and supplying the resulting ATM cells to the distribution network.

Typically the plurality of digital signals can comprise television program signals in the form of an MPEG data stream.

The method conveniently further includes the step of supplying the scrambling key in encrypted form in ATM cells to subscribers via the distribution network. This can comprise the steps of encrypting the scrambling key using different public keys for different subscribers to produce different encrypted forms of the scrambling key for the different subscribers, and supplying the different encrypted forms of the scrambling key to the distribution network for decryption by the respective subscribers using respective private keys of the subscribers.

Another aspect of this invention relates to a method of providing a plurality of television program signals in service tiers in a distribution network, each service tier comprising at least one of said television program signals, comprising the steps of:

providing each television program signal as a digital signal in ATM (asynchronous transfer mode) cells with a virtual channel (VC) identification of each ATM cell identifying the respective television program signal and a virtual path (VP) identification of each ATM cell identifying the service tier comprising the respective television program signal;

allocating different scrambling keys to different VPs and hence to different service tiers; scrambling the digital signals in the ATM cells in dependence upon the scrambling key allocated to the respective VPs of the ATM cells; and supplying the resulting ATM cells to the distribution network.

According to a further aspect, this invention provides subscriber apparatus for connection to a digital signal broadcast distribution network, the apparatus comprising: a selector for selecting from the network ATM (asynchronous transfer mode) cells having a virtual path (VP) identification corresponding to a group of one or more digital signal channels on the network and having a virtual channel (VC) identification corresponding to an individual one of the digital signal channels of the group; a store for storing a key associated with said VP for unscrambling scrambled contents of the selected ATM cells; and a unit responsive to the selected ATM cells and the key associated with said VP for unscrambling the contents of the selected ATM cells to produce said individual one of the digital signal channels for use at the subscriber apparatus.

The apparatus conveniently includes a decryption unit responsive to a private key of the subscriber apparatus and to encrypted information in ATM cells on the network for producing said key associated with said VP for storage in the store.

BRIEF DESCRIPTION OF THE DRAWINGS

The invention will be further understood from the following description with reference to the accompanying drawings, in which.

DETAILED DESCRIPTION

Figure 1:
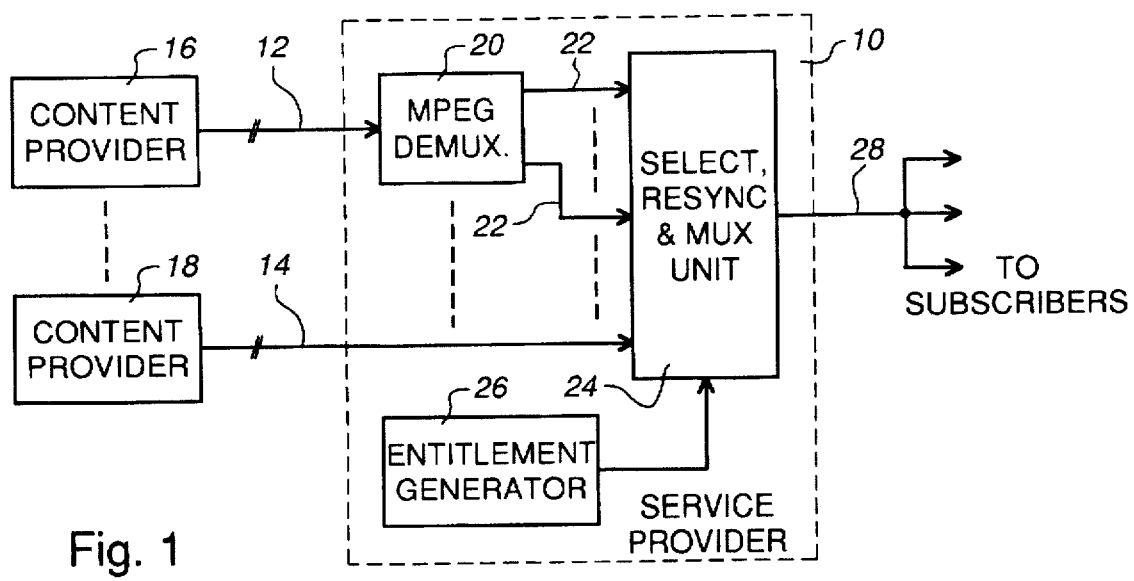
FIG. 1 is a block diagram illustrating a digital signal broadcasting arrangement in accordance with the prior art.

Referring to FIG. 1, a digital signal broadcasting arrangement in accordance with the prior art includes a service provider 10, shown within a dashed line box and for example in the form of a cable network operator, which is supplied with television program signals in the form of MPEG streams via communications paths 12 and 14 from content providers 16 and 18 respectively, only two content providers being shown for simplicity. The content provider 16 is assumed here to provide on the path 12 a plurality of television program signals multiplexed in a single MPEG stream with a common time sequence. At the service provider 10 this is demultiplexed by an MPEG stream demultiplexer 20 into a plurality of separate MPEG streams, each with its own time sequence, on paths 22 two of which are shown. Each of the paths 22, and the path 14 which is assumed here to provide an individual television program signal and time sequence in an MPEG stream, constitutes a respective input to a unit 24. Other single or multiple program MPEG streams from other content providers are handled in a corresponding manner to provide multiple single-program MPEG streams, each with its own time sequence, to the unit 24.

For each of one or more service tiers, each typically comprising a plurality of television program signals, the unit 24 serves for selecting the respective single-program PEG streams from the inputs of the unit 24, resynchronizing these, adding subscriber entitlement information supplied at the service provider by an entitlement generator 26, multiplexing the signals into a multi-program MPEG stream with a common timing sequence for all of the program signals, and supplying the resulting MPEG stream to a cable network 28 for broadcast distribution to subscriber equipment connected to the cable network. As explained in the background of the invention, this requires very intensive computation by the unit 24, which accordingly is complex and costly to provide. It is observed in this respect that the demultiplexing provided by the unit 20 is much simpler than the resynchronization and multiplexing provided in the unit 24.

Figure 2:
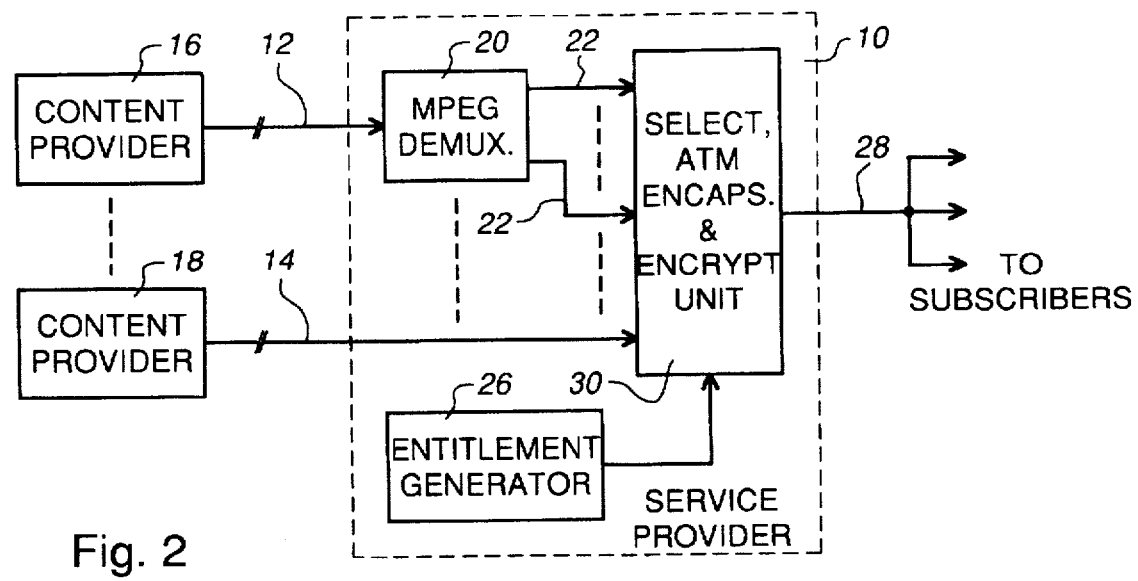
FIG. 2 is a block diagram illustrating a digital signal broadcasting arrangement in accordance with the invention.

FIG. 2 illustrates a digital signal broadcasting arrangement in accordance with the invention, which is architecturally similar to the arrangement of FIG. I except that the service provider 10 includes a unit 30 instead of the unit 24, and the entitlement generator 26 is modified to operate consistently with the description below. The unit 30 serves, like the unit 24 in FIG. 1, to select the single-program signals from the input MPEG streams on the paths 14 and 22 to constitute the desired service tier, but handles these streams in a different manner from the unit 24. This handling includes an encapsulation of the MPEG streams into ATM (asynchronous transfer mode) cells, and encryption of the cell data, as described below.

As is well known, ATM cells each comprise a header of five bytes or octets and a payload of 48 bytes or octets. The header includes 24 bits which conventionally provide an 8-bit virtual path (VP) identifier and a 16-bit virtual channel (VC) identifier which serve as an address for the ATM cell. It is well known to use ATM cells for communicating arbitrary types of data; for example, ATM cells could be used on the paths 12 and 14 for communicating MPEG streams from the content providers 16 and 18 to the service provider 10. In this case, the VP and VC in each cell header would identify the service provider 10 as the recipient of the ATM cell data. In an arrangement in accordance with the invention, ATM cells are also used for distribution of signals via the cable network 28, but the VP and VC are used in a different manner from such conventional use in ATM cells in the prior art.

More specifically, in the arrangement of FIG. 2 the cable network 28 is a broadcast distribution network in which all signals are delivered to all subscribers. Accordingly, the VP and VC in the cell headers are not required to identify specific subscribers or recipients of the cells. Instead, in the network 28 the VP is used to identify a service tier. Within that service tier, each individual television program signal is allocated an individual, respective VC, and the single MPEG stream for that signal, comprising both the program data and the respective time sequence, is communicated in the payload of the ATM cells identified by that VC. Thus the service tier is uniquely identified by the VP, and each television program signal in that service tier is uniquely identified by the respective VC with that VP, whose ATM cell payloads contain all of the program data for that one television program signal. There is therefore no resynchronization or multiplexing of MPEG streams in the unit 30 in the arrangement of FIG. 2.

With this arrangement, there can be an arbitrary number up to 255 ($2^8$, minus one VP for signalling purposes) of service tiers, and an arbitrary number from 1 to $2^{16}$ of television program signals (each a single program MPEG stream).

In order to ensure that only subscribers entitled to receive the television program signals in the service tier can properly receive these signals, an encryption or scrambling key is allocated to the VP corresponding to the service tier; this is referred to as a service tier key. For each television program signal, and hence VC, within that service tier, the entire payload of each ATM cell is encrypted using the service tier key. Consequently, any subscriber supplied with the service tier key can use this to decrypt all of the television program signals in that service tier.

Distribution of the service tier key to individual subscribers can be performed in any known manner, using known security techniques. Conveniently, a VC of the signalling VP mentioned above is used for broadcasting entitlement information to the subscribers to be used individually by each of them. In this case public/private key encryption can be used to ensure that the service tier key can only be received by each subscriber for which it is intended. This is explained further below.

Accordingly, for each television program signal on a path 14 or 22 incoming to the unit 30 that is selected to be included in a particular service tier, the unit 30 encapsulates the individual MPEG stream for that program signal in the payload of ATM cells having a VC allocated to that program signal and having a VP allocated to that service tier, and encrypts the payload of each such ATM cell in accordance with a scrambling key that is allocated to that service tier. The ATM cells for all of the program signals in all of the service tiers, together with ATM cells containing entitlement information from the entitlement generator 26 as described above, are supplied to the cable network 28 for broadcast distribution to all of the subscribers.

Figure 3:
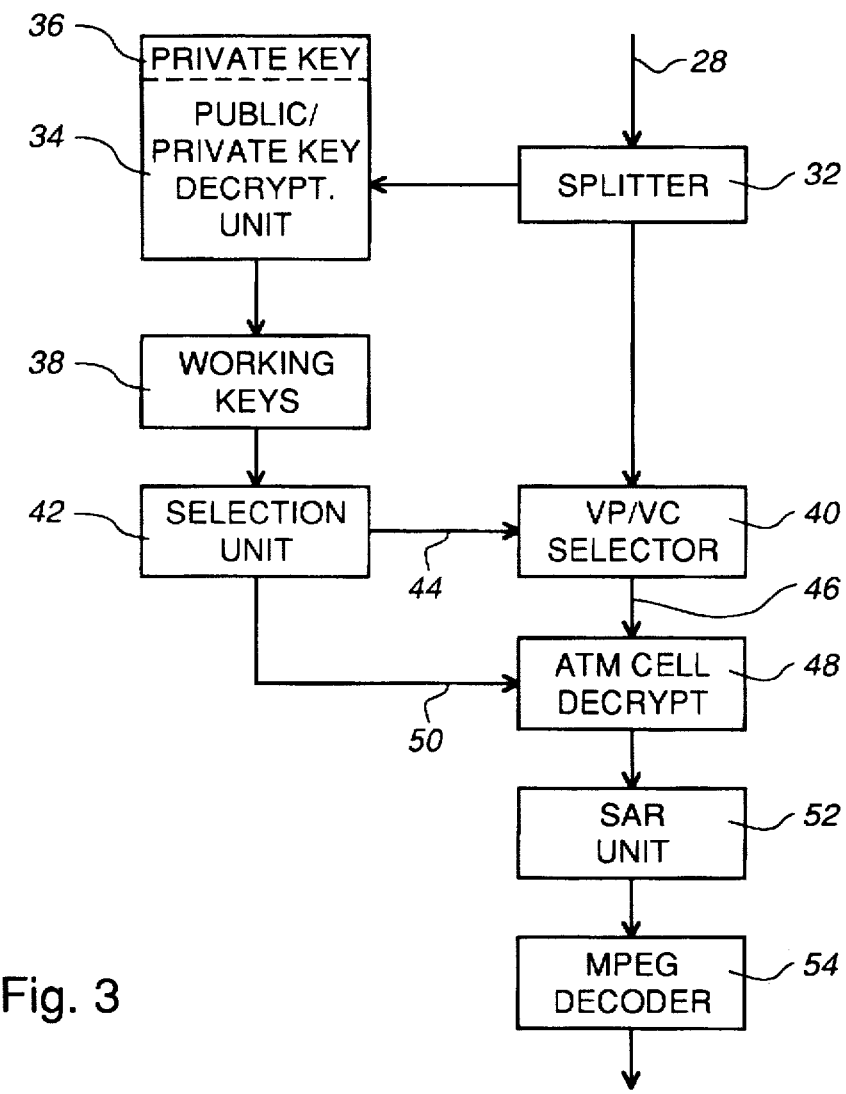
FIG. 3 is a block diagram illustrating subscriber apparatus in a digital signal broadcasting arrangement in accordance with the invention.

FIG. 3 illustrates apparatus at a subscriber to the digital signal broadcasting arrangement of FIG. 2, including a splitter 32 that is connected to the cable network 28 and serves to separate entitlement information ATM cells for the subscriber and supply these to a public/private key decryption unit 34. In known manner, the unit 34 stores a private key 36 allocated to the individual subscriber, which permits only this subscriber to decrypt information encrypted using a public key of the subscriber. Entitlement information, in particular the service tier key for each service tier for which this subscriber is entitled, is encrypted by the entitlement generator 26 at the service provider 10 using the public key of this subscriber and is distributed via the network 28 as described above, with an address or other identification of this subscriber for which it is intended. Only this subscriber is able to decrypt this entitlement information, using the private key 36, to reproduce the service tier key which is thereby communicated securely to this subscriber. Service tier keys are similarly communicated to other subscribers in a secure manner using their respective public/private keys. At each subscriber, each decrypted service tier key is stored as one of a set of working keys 38. It can be appreciated that this arrangement facilitates changing or updating of the service tier keys by the service provider 10 whenever desired.

The splitter 32 supplies other ATM cells, containing the television program signals and with encrypted payloads as described above, to a VP/VC selector 40. A selection unit 42, which serves to select a particular television program in a manner equivalent to a channel selector, supplies the VC of a desired television program signal, and the VP of the service tier in which that program signal is included, via a path 44 to the selector 40, which accordingly passes to its output path 46 only those ATM cells from the network 28 having that VP and VC and hence including the MPEG stream of the desired television program signal. These cells on the path 46 are supplied to an ATM cell decryption unit 48, which (assuming that this subscriber is entitled to receive programs in this service tier) decrypts the payload of each cell using the respective working key supplied from the set of working keys 38 via the selection unit 42 and a path 50.

The decrypted ATM cells from the unit 48 are supplied to an SAR (segmentation and reassembly) unit 52 of known form to reproduce the individual MPEG stream for the television program signal, which is supplied to an MPEG decoder 54 also of known form for decoding the MPEG stream to reproduce the original television program signal for use.

Although a particular form of the invention has been described in detail, it can be appreciated that numerous modifications, variations, and adaptations may be made without departing from the scope of the invention as defined in the claims.

What is claimed is:

1. A method of broadcasting a plurality of digital signals, each comprising a data stream including data and timing information, to a distribution network for supply to a plurality of subscribers, comprising the steps of:

allocating a virtual path (VP) identification of ATM (asynchronous transfer mode) cells to the plurality of digital signals and a respective virtual channel (VC) identification of the ATM cells to each individual one of the plurality of digital signals;

encapsulating the data stream of each of the plurality of digital signals in ATM cells having said VP identification and the respective VC identification;

scrambling the encapsulated data stream in each ATM cell having said VP identification in dependence upon a scrambling key allocated to the VP; and supplying the resulting ATM cells to the distribution network.

2. A method as claimed in claim 1 wherein the plurality of digital signals comprise television program signals.

3. A method as claimed in claim 1 wherein each data stream constituting one of the plurality of digital signals comprises an MPEG (Moving Pictures Experts Group) data stream.

4. A method as claimed in claim 1 wherein the step of supplying the resulting ATM cells to the distribution network comprises step of supplying the resulting ATM cells to a cable television distribution network.

5. A method as claimed in claim 1 and further including the step of supplying the scrambling key in encrypted form in ATM cells to subscribers via the distribution network.

6. A method as claimed in claim 5 wherein the step of supplying the scrambling key in encrypted form in ATM cells to subscribers comprises the steps of encrypting the scrambling key using different public keys for different subscribers to produce different encrypted forms of the scrambling key for the different subscribers, and supplying the different encrypted forms of the scrambling key to the distribution network for decryption by the respective subscribers using respective private keys of the subscribers.

7. A method of providing a plurality of television program signals in service tiers in a distribution network, each service tier comprising at least one of said television program signals, comprising the steps of:

providing each television program signal as a digital signal in ATM (asynchronous transfer mode) cells with a virtual channel (VC) identification of each ATM cell identifying the respective television program signal and a virtual path (VP) identification of each ATM cell identifying the service tier comprising the respective television program signal;

allocating different scrambling keys to different VPs and hence to different service tiers;

scrambling the digital signals in the ATM cells in dependence upon the scrambling key allocated to the respective VPs of the ATM cells; and supplying the resulting ATM cells to the distribution network.

8. A method as claimed in claim 7 wherein each digital signal comprises an MPEG (Moving Pictures Experts Group) data stream.

9. A method as claimed in claim 7 and further including the step of supplying the scrambling keys in encrypted form in ATM cells to subscribers via the distribution network.

10. A method as claimed in claim 9 wherein the step of supplying the scrambling keys in encrypted form in ATM cells to subscribers comprises the steps of selectively encrypting the scrambling keys using different public keys for different subscribers to produce different encrypted forms of selected scrambling keys for the different subscribers, and supplying the different encrypted forms of the selected scrambling keys to the distribution network for decryption by the respective subscribers using respective private keys of the subscribers.

11. Subscriber apparatus for connection to a digital signal broadcast distribution network, the apparatus comprising:

a selector for selecting from the network ATM (asynchronous transfer mode) cells having a virtual path (VP) identification corresponding to a group of one or more digital signal channels on the network and having a virtual channel (VC) identification corresponding to an individual one of the digital signal channels of the group;

a store for storing a key associated with said VP for unscrambling scrambled contents of the selected ATM cells; and a unit responsive to the selected ATM cells and the key associated with said VP for unscrambling the contents of the selected ATM cells to produce said individual one of the digital signal channels for use at the subscriber apparatus.

12. Apparatus as claimed in claim 11 and including a decryption unit responsive to a private key of the subscriber apparatus and to encrypted information in ATM cells on the network for producing said key associated with said VP for storage in the store.

13. Apparatus as claimed in claim 12 and including a decoder for decoding an MPEG (Moving Pictures Experts Group) data stream constituted by said individual one of the digital signal channels.

14. Apparatus as claimed in claim 11 and including a decoder for decoding an MPEG (Moving Pictures Experts Group) data stream constituted by said individual one of the digital signal channels.

* * * * *